(12) United States Patent
Kim

(10) Patent No.: US 6,426,920 B2
(45) Date of Patent: *Jul. 30, 2002

(54) METHOD AND APPARATUS FOR SETTING INITIAL TIME OF OPERATING SYSTEM CLOCK

(75) Inventor: Seok-am Kim, Daejeon (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,287

(22) Filed: Sep. 28, 1998

(30) Foreign Application Priority Data

Sep. 26, 1997 (KR) .................................. 97-49092

(51) Int. Cl.[7] .............................................. G04C 11/00
(52) U.S. Cl. ......................................................... 368/46
(58) Field of Search ................................... 368/46, 10

(56) References Cited

U.S. PATENT DOCUMENTS

| | | | |
|---|---|---|---|
| 3,681,914 A | 8/1972 | Loewengart | |
| 3,852,953 A | 12/1974 | Mischiatti | |
| 4,322,831 A | 3/1982 | Peterson | |
| 5,040,158 A | 8/1991 | Lee et al. | |
| 5,282,180 A | * 1/1994 | Burke et al. | 368/46 |
| 5,384,738 A | 1/1995 | Miyaoka et al. | |
| 5,425,004 A | * 6/1995 | Staffan | 368/46 |
| 5,579,510 A | 11/1996 | Wang et al. | |
| 5,805,530 A | 9/1998 | Youngberg | |

* cited by examiner

*Primary Examiner*—Bernard Roskoski
(74) *Attorney, Agent, or Firm*—Robert E. Bushnell, Esq.

(57) ABSTRACT

To set the initial time in a clock managed by an operating system in a personal computer system, when the power is turned on, the ROM-BIOS of the personal computer system is checked and the operating system is booted. Next, the current time is read from a CMOS clock of the personal computer system and the time read is set as the initial time in a clock managed by the operating system. Then, the current time is read from the CMOS clock again and the read current time is compared with the time of the clock managed by the operating system. If the times do not match each other, the above reading and setting processes are repeated. Thus, the time managed by the CMOS clock and the time managed by the OS clock in a PC system can coincide so that the time managed by the OS clock can be reliable for application programs requiring an accurate real-time management.

20 Claims, 2 Drawing Sheets

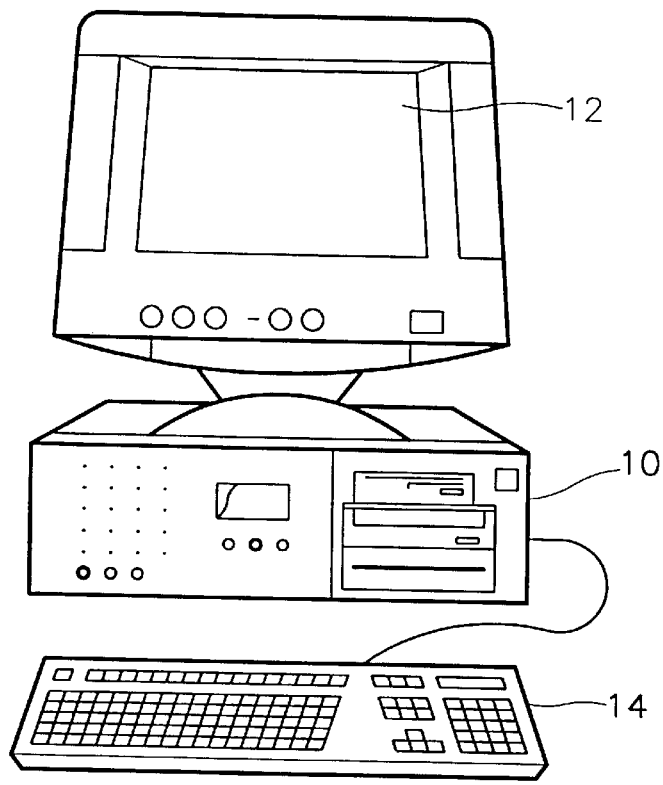
FIG. 1 *(Prior Art)*
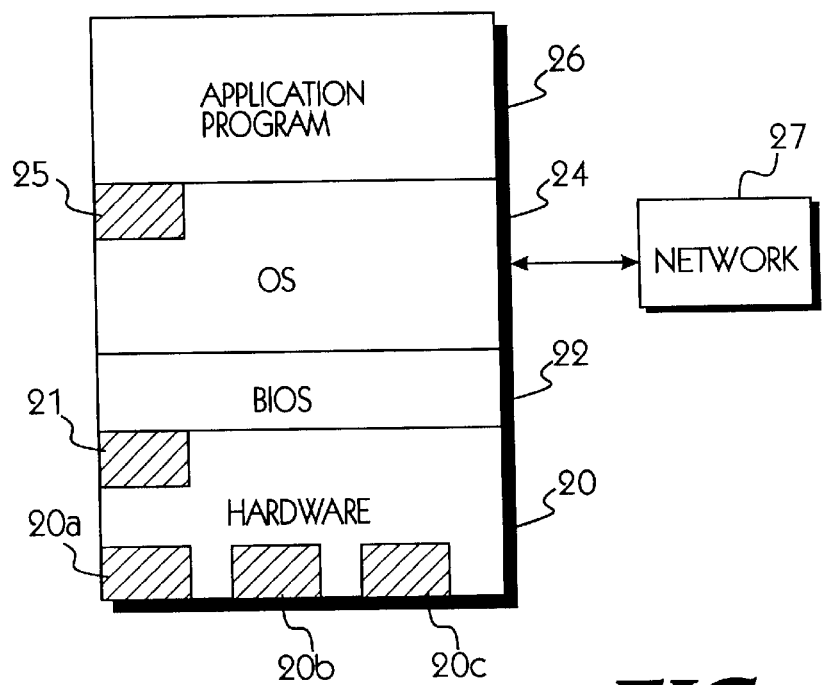
FIG. 2

METHOD AND APPARATUS FOR SETTING INITIAL TIME OF OPERATING SYSTEM CLOCK

CLAIM OF PRIORITY

This application makes reference to, incorporates the same herein, and claims all benefits accruing under 35 U.S.C. §119 from an application for *METHOD FOR SETTING INITIAL TIME OF OPERATING SYSTEM CLOCK* earlier filed in the Korean Industrial Property Office on Sep. 26, 1997 and there duly assigned Ser. No. 49092/1997.

BACKGROUND OF THE INVENTION

1. Field of the Invention

The present invention relates to a method for managing the CMOS (complementary metal oxide semiconductor) clock for a personal computer (PC), and more particularly, to a method for setting the initial time of an operating system (OS) clock operating in a PC.

2. Description of the Related Art

In general, to set the initial time of an OS clock itself, the OS reads the time from a CMOS clock during initial stages of a boot process, and then sets the time read from the CMOS clock as the initial time of the OS clock in the latter stages of a boot process.

Thus, in the earlier method, when the OS is interrupted by another operation after reading the time from the CMOS clock, the time set to be the initial time of the OS clock is a delayed time. In this case, the time managed by the CMOS clock does not match the time managed by the OS clock. Such a discrepancy can cause problems in applications requiring accurate real-time management.

Also, U.S. Pat. No. 3,681,914 to Loewengart, entitled *Digital Master Clock*, discloses a master clock source which develops clock signals for transmission to a plurality of receiving "slave" terminals, wherein the clock signals are periodically scanned and transferred to the slave terminals once each second, thereby to continuously up-date the clock indication at the receiving terminals. U.S. Pat. No. 3,852,953 to Mischiatti, entitled *Control And Synchronization Of Clocks*, discloses a plurality of slave clocks that are controlled and synchronized from a central station which transmits to each slave clock frequent coded signals each of which conveys in coded form complete information as to the time, and possibly also the date, to be displayed by each slave clock. U.S. Pat. No. 4,322,831 to Peterson, entitled *Programmed Digital Secondary Clock*, discloses a programmed digital secondary clock which functions as a master clock, a sub-master clock or a slave clock. The master clock is disclosed as maintaining an updated real time count based on a 50 hz or 60 hz AC line or digital oscillator signal, displays the count, and serially transmits digital information representative of the updated real time count for use by a slave clock. It is disclosed that the submaster clock receives an hourly or twice-a-day correction signal from a conventional master clock or a conventional electronic receiver, corrects the real time count, displays the corrected count, and serially transmits digital information representative of the corrected real time count for use by a slave clock. U.S. Pat. No. 5,040,158 to Lee et al., entitled *Method For Operating And Maintaining A Clock Of A System*, disclose a method of operating and maintaining the clock of the system for determining a reference clock of the system when starting an operation and maintenance processor (OMP), including a first step of requesting and receiving a hardware clock from a network synchronizing processor (NSP), a second step of checking if the received hardware clock does not fall between a predetermined minimum and a predetermined maximum, and if so, providing an alarm message which requires an operator to provide information on a reference clock and if not, requesting reference clocks from all of the processors except an operation and maintenance processor (OMP), and a third step of comparing the hardware clock and the received reference clocks as many times as the number of the received reference clocks, and determining the hardware clock as a reference clock of the system if a difference is less than or equal to a predetermined time for more than the predetermined number of times and if not, providing an alarm message which requires the operator to provide information on a clock as necessary to determine the reference clock of the system. U.S. Pat. No. 5,384,738 to Miyaoka et al., entitled *Semiconductor Integrated Circuit Device*, disclose a semiconductor integrated circuit device such as a memory device with logic function including a plurality of RAM macrocells and gate arrays, with the RAM macrocells constituted by bipolar CMOS RAMs having a total memory capacity of at least 100 kilobits, and the gate arrays contain at least 4000 gates. It is disclosed that the semiconductor integrated circuit device includes a clock distribution circuit coupled to receive first clock signals and for outputting second clock signals, with the first clock signals and the second clock signals being of an ECL level. U.S. Pat. No. 5,579,510 to Wang et al., entitled *Method And Structure For Use In Static Timing Verification Of Synchronous Circuits*, disclose a universal synchronization element used in a static timing verification system to represent selected combinational primitive elements, synchronous primitive elements and external primitive elements in the user's synchronous digital circuit. It is disclosed that each of these digital circuit elements in a user's digital circuit design is represented by a corresponding universal synchronization element having a propagation time characteristic equivalent to the digital circuit element and a stable time characteristic equivalent to the digital circuit element, wherein the propagation and stable time characteristics are defined in relation to a clock signal for the digital circuit element in the user's circuit that the universal synchronization element represents. U.S. Pat. No. 5,805,530 to Youngberg, entitled *System, Method, And Device For Automatic Setting Of Clocks*, discloses a system, method and device for providing automatic setting of time of day and other information used by clocks and clock circuits/functions found in host devices such as household appliances, automobiles, wrist watches, computers and other electronic devices. The system is disclosed as including a remote host time piece device for maintaining the time of day and has a timebase with a reference from an electronic input, and includes a master time piece for obtaining the correct time and for transmitting the correct time to the remote host timepiece device. It is disclosed that circuitry is included in the system for accepting the transmission of the correct time from the master time piece and for setting the time of day in the remote host time piece device to the correct time transmitted from the master time piece. Also, included in the system is circuitry, remote from the master time piece, for initiating from the master time piece the transmission of the correct time to the remote host time piece device upon the occurrence of at an event, such that the master time piece transmits to the remote host time piece device an accuracy number that is used to determine based upon a selected tolerance whether the transmitted correct time from the master time piece is to be accepted for setting the time of day in the remote host time piece device to the correct time transmitted from the master time piece.

SUMMARY OF THE INVENTION

To solve the above problem, it is an objective of the present invention to provide a method for setting the initial time of an OS clock so that the time managed by the CMOS clock in a PC matches the time managed by the OS clock.

Accordingly, to achieve the above objective and other objectives, there is provided a method for setting the initial time in a clock managed by an operating system in a personal computer system, which have the steps of: turning on the power and checking the ROM-BIOS (read only memory-basic input/output system) of the personal computer system; booting the operating system; reading the current time from a CMOS clock of the personal computer system; setting the time read from the CMOS clock as the initial time in a clock managed by the operating system; and again reading the current time from the CMOS clock and comparing the read current time with the time of the clock managed by the operating system and, if the times do not match each other, repeating the steps of reading the current time from the CMOS clock and setting the time read from the CMOS clock in the clock managed by the operating system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a view illustrating a personal computer system to which the present invention is applicable;

FIG. 2 is a diagram showing a relationship between hardware and software of a PC system to which the present invention is applicable.

DETAILED DESCRIPTION OF THE INVENTION

Figure 3:
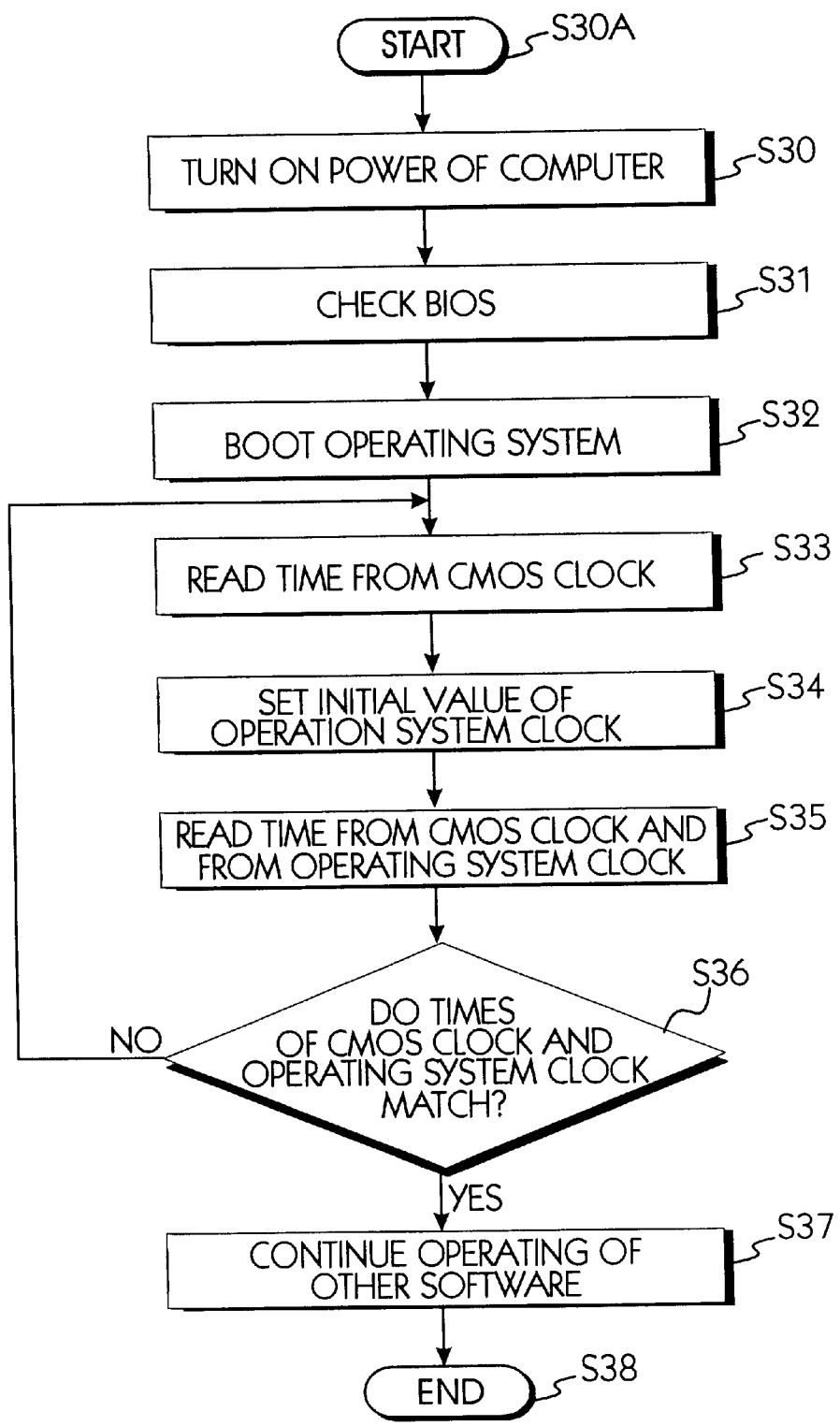
FIG. 3 is a flow chart showing a method of setting the initial time to a timer or clock managed by an operating system according to the present invention.

Referring to FIG. 1, a personal computer (PC) system to which the present invention is applicable is largely comprised of a main case 10 and input/output devices and there is a monitor 12 and a keyboard 14 as the basic input/output devices. A central processing unit (CPU) 20a, a memory 20b, and disk drivers 20c are included in the main case 10, as illustrated in FIG. 2.

FIG. 2 shows a hierarchic structure of hardware and software in a PC system to which the present invention is applicable. Referring to the drawing, a BIOS (basic input/output system) 22 is disposed above a hardware 20 which includes the CPU 20a, memory 20b, and disk drives 20c. BIOS 22 includes a ROM (read only memory), and supports other software. System programs including an operating system (OS) 24 provides an environment for the operation of application programs 26 by controlling hardware 20 directly or via the BIOS 22.

A PC system has a predetermined operating system clock 25, and the OS 24 uses time information provided by the operating system clock 25 in managing every resource of the PC system and scheduling software. The most basic clock for the PC system is a CMOS clock 21 which is one of the hardware 20 constituting the PC system. The CMOS clock 21 has its own battery so that the time is kept by the CMOS clock 21 even when power is not supplied to the PC system.

In the meantime, the OS 24 has its own operating system clock or clock 25 to eliminate the need to continuously access the CMOS clock 21 and manage time by itself. The clock 25 managed by the OS 24, such as by a Windows 95® operating system, for example, can be appropriately maintained when the power is supplied to a computer system and the OS 24 is being executed.

Accordingly, when the OS 24 performs the boot process, a portion of the OS 24 which completes initialization reads the current time using real-time interrupt from the CMOS clock 21 and sets the read time as the initial time of the clock 25 managed by the OS 24. Next, the OS 24 manages the current time using the clock 25 without accessing the CMOS clock 21.

FIG. 3 shows a method of setting the initial time of the clock managed by the OS 24 according to the present invention.

The process starts at step S30A and then proceeds to step S30. When a user turns on the power of the PC system at step S30, the BIOS 22 of the PC system is checked at step S31 and the OS 24 is booted from a disk drive 20c or network 27 at step S32. After booting of the OS 24 is completed, a time-set software of OS 24 is executed to set the correct time to the clock 25 managed by the OS 24. The time-set software of OS 24 reads the time from the CMOS clock 21 at step S33 and the read time is set as the initial time of the clock 25 managed by the OS 24 at step S34.

The process then proceeds to step S35 where the time-set software of OS 24 again reads the time from the CMOS clock 21 and reads the time of clock 25 managed by OS 24; and then compares the time again read from CMOS clock 21 in step S35 with the time of clock 25 managed by the OS 24 in step S36. If the time again read from CMOS clock 21 and the current time read from clock 25 managed by OS 24 do not match, the process returns and steps S33–S36 are repeated. Otherwise, the time of clock 25 managed by the OS 24 is considered to be appropriately set and thus the time-set software is terminated. The process then proceeds to step S37 where the OS 24 takes over control from the time-set software and can operate or continue to operate other software. The process then ends at step S38.

However, to prevent an infinite loop between steps S33 through S36 due to unexpected interference, it is preferable that the above repetition of steps S33–S36 be terminated when the above steps S33–S36 repeat for a predetermined time period after step S36 first begins or, alternatively, steps S33–S36 repeat for a predetermined number of the times.

As described above, according to the method of the present invention, the time managed by the CMOS clock 21 of the CMOS and the time managed by the clock 25 of the OS 24 in a PC system can match so that the time managed by the OS 24 can be reliable for application programs requiring an accurate real-time management.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for setting an initial time in a clock for an operating system in a personal computer system, comprising the steps of:

turning on power and checking a read only memory-basic input/output system of said personal computer system;

booting said operating system;

reading a current time from a complementary metal oxide semiconductor clock of said personal computer system after booting said operating system;

setting the time read from said complementary metal oxide semiconductor clock as an initial time in said clock for said operating system;

reading again a current time from said complementary metal oxide semiconductor clock; and comparing the read again current time from said complementary metal oxide semiconductor clock with a current time of said clock for said operating system to determine whether the read again current time from said complementary metal oxide semiconductor clock and the current time of said clock for said operating system match to set a time in said clock for said operating system for time managed by said operating system for real-time management for an application program for said personal computer system.

2. The method as claimed in claim 1, further comprising a repeating step when the read again current time from said complementary metal oxide semiconductor clock and the current time of said clock for said operating system do not match, said repeating step including repeating said steps of reading a current time from said complementary metal oxide semiconductor clock of said personal computer system, setting the time read from said complementary metal oxide semiconductor clock as an initial time in said clock for said operating system, reading again a current time from said complementary metal oxide semiconductor clock, and comparing the read again current time from said complementary metal oxide semiconductor clock with a current time of said clock for said operating system to determine whether the read again current time from said complementary metal oxide semiconductor clock and the current time of said clock for said operating system match.

3. The method as claimed in claim 2, further comprised of said repeating step being terminated when said repeating step is repeated for a predetermined duration of a predetermined time.

4. The method as claimed in claim 2, further comprised of said repeating step being terminated when said repeating step is repeated for a predetermined number of times.

5. The method as claimed in claim 2, further comprised of said operating system being booted from a disk drive of said personal computer system.

6. The method as claimed in claim 1, further comprised of said operating system being booted from a disk drive of said personal computer system.

7. A method for setting an initial time in a clock for an operating system in a personal computer system, comprising the steps of:

reading a current time from a complementary metal oxide semiconductor clock of said personal computer system after booting said operating system;

setting the time read from said complementary metal oxide semiconductor clock as an initial time in said clock for said operating system;

reading again a current time from said complementary metal oxide semiconductor clock; and comparing the read again current time from said complementary metal oxide semiconductor clock with a current time of said clock for said operating system to determine whether the read again current time from said complementary metal oxide semiconductor clock and the current time of said clock for said operating system match to said clock for said operating system for time managed by said operating system for real-time management for an application program for said personal computer system.

8. The method as claimed in claim 7, further comprising a repeating step when the read again current time from said complementary metal oxide semiconductor clock and the current time of said clock for said operating system do not match, said repeating step including repeating said steps of reading a current time from said complementary metal oxide semiconductor clock of said personal computer system, setting the time read from said complementary metal oxide semiconductor clock as an initial time in said clock for said operating system, reading again a current time from said complementary metal oxide semiconductor clock, and comparing the read again current time from said complementary metal oxide semiconductor clock with a current time of said clock for said operating system to determine whether the read again current time from said complementary metal oxide semiconductor clock and the current time of said clock for said operating system match.

9. The method as claimed in claim 8, further comprised of said repeating step being terminated when said repeating step is repeated for a predetermined duration of a predetermined time.

10. The method as claimed in claim 8, further comprised of said repeating step being terminated when said repeating step is repeated for a predetermined number of times.

11. An apparatus for setting an initial time in a clock for an operating system in a personal computer system, comprising:

a complementary metal oxide semiconductor clock for said personal computer system;

an operating system clock; and an operating system of said personal computer system, said operating system including said operating system clock, said operating system for reading a current time from said complementary metal oxide semiconductor clock after booting said operating system, for setting the time read from said complementary metal oxide semiconductor clock as an initial time in said operating system clock for said operating system, for reading again a current time from said complementary metal oxide semiconductor clock, and for comparing the read again current time from said complementary metal oxide semiconductor clock with a current time of said operating system clock for said operating system to determine whether the read again current time from said complementary metal oxide semiconductor clock and the current time of said operating system clock for said operating system match to set a time in said operating system clock for said operating system for time managed by said operating system for real-time management for an application program for said personal computer system.

12. The apparatus as claimed in claim 11, further comprising a read only memory-basic input/output system of said personal computer system.

13. The apparatus as claimed in claim 12, further comprising a disk drive of said personal computer system for booting said operating system of said personal computer system.

14. The apparatus as claimed in claim 11, further comprising a disk drive of said personal computer system for booting said operating system of said personal computer system.

15. The apparatus as claimed in claim 11, further comprised of when the read again current time from said complementary metal oxide semiconductor clock and the current time of said operating system clock for said operating system do not match, said operating system performs a repetition of reading a current time from said complementary metal oxide semiconductor clock, setting the time read from said complementary metal oxide semiconductor clock as an initial time in said operating system clock for said operating system, reading again a current time from said complementary metal oxide semiconductor clock, and comparing the read again current time from said complementary metal oxide semiconductor clock with a current time of said operating system clock for said operating system to determine whether the read again current time from said complementary metal oxide semiconductor clock and the current time of said operating system clock for said operating system match.

16. The apparatus as claimed in claim 15, further comprised of said operating system terminates said repetition when said repetition is performed for a predetermined duration of a predetermined time.

17. The apparatus as claimed in claim 15, further comprised of said operating system terminates said repetition when said repetition is performed for a predetermined number of times.

18. The apparatus as claimed in claim 15, further comprising a read only memory-basic input/output system of said personal computer system.

19. The apparatus as claimed in claim 18, further comprising a disk drive of said personal computer system for booting said operating system of said personal computer system.

20. The apparatus as claimed in claim 15, further comprising a disk drive of said personal computer system for booting said operating system of said personal computer system.

* * * * *